Aug. 20, 1929.   M. E. LAYNE   1,725,401
DRIVING MECHANISM
Filed Feb. 18, 1924   3 Sheets-Sheet 1
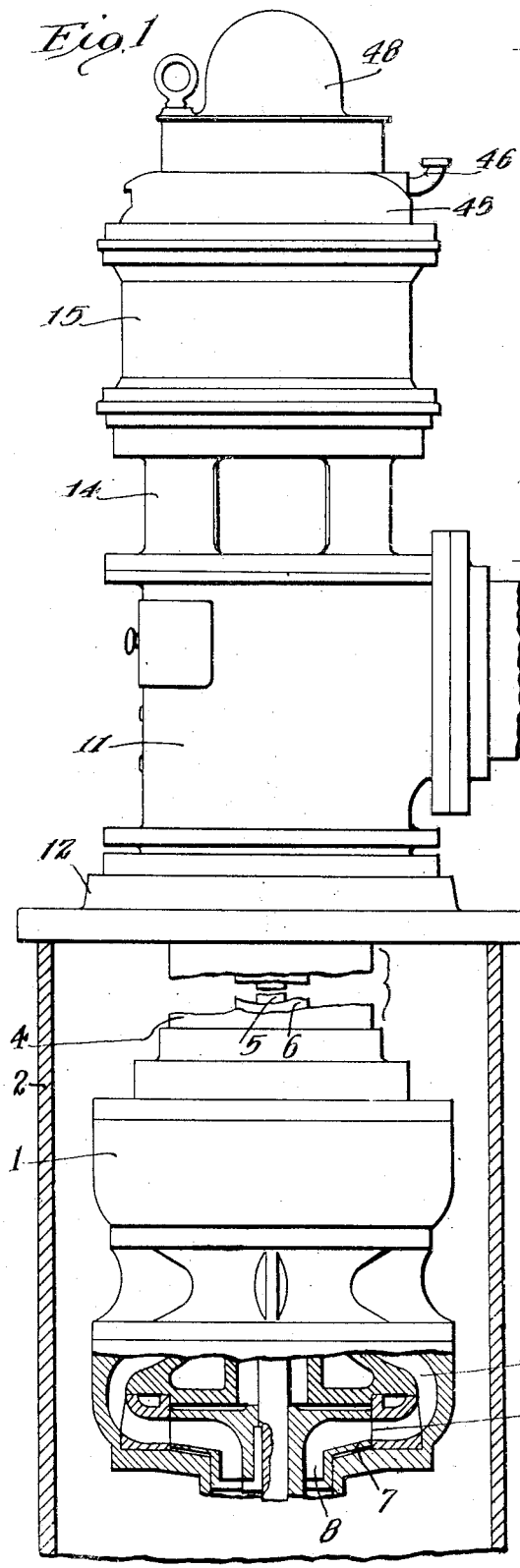
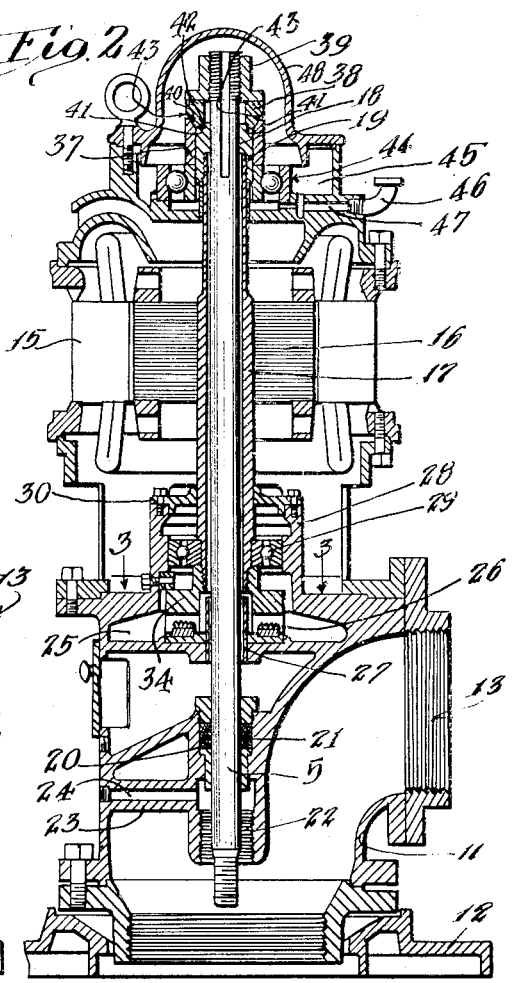
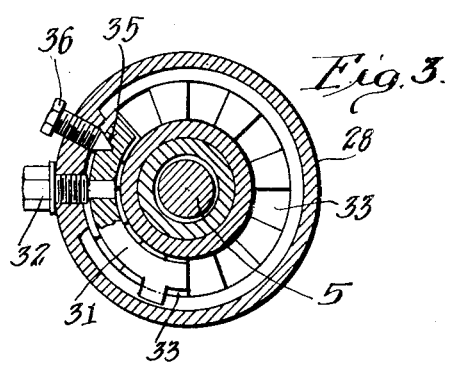
Inventor
Mahlon E. Layne
By Lyon & Lyon
Attorneys

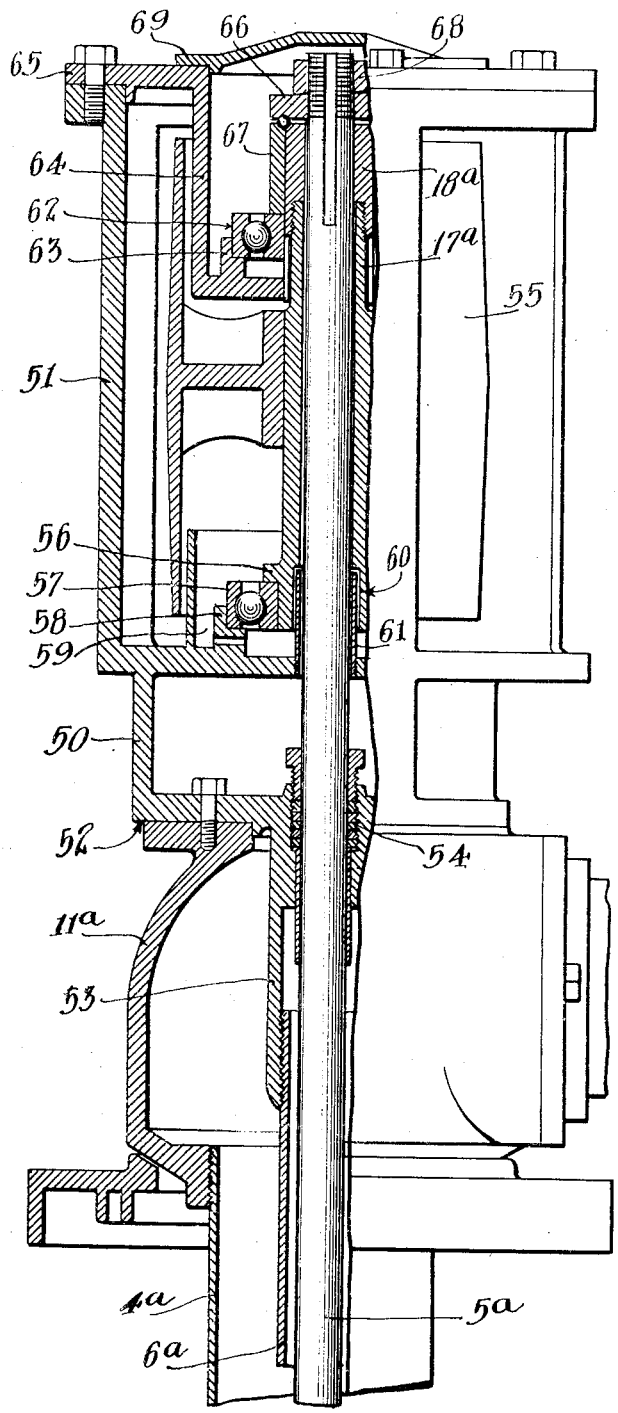

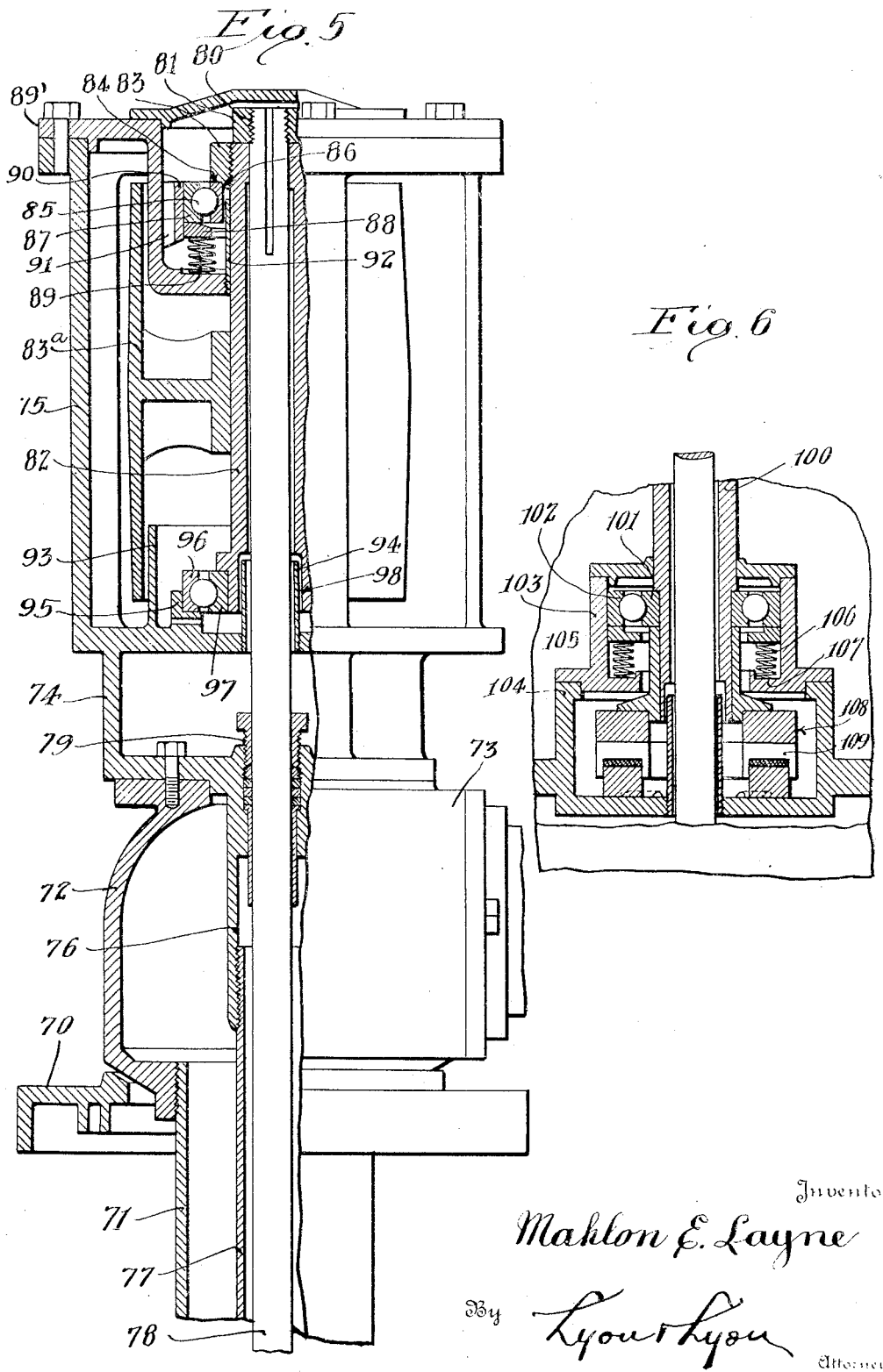

Patented Aug. 20, 1929.

1,725,401

UNITED STATES PATENT OFFICE.

MAHLON E. LAYNE, OF SOUTH PASADENA, CALIFORNIA, ASSIGNOR TO LAYNE & BOWLER CORPORATION, OF LOS ANGELES, CALIFORNIA, A CORPORATION OF CALIFORNIA.

DRIVING MECHANISM.

Application filed February 18, 1924. Serial No. 693,551.

This invention relates to driving mechanism, and refers particularly to a driving mechanism for rotary pumps of the type employed in deep water or other fluid wells.

One of the greatest difficulties with the rotary pump mechanism of the type employed for driving a pump supported in a deep water or other well is encountered in preventing the radial bearings of the mechanism from chattering in use. The chattering of such radial bearings in the common form of rotary pump mechanism is due to a number of causes. Thus, frequently to enable the common radial bearings to properly receive the load, the radial bearings of the rotary pump mechanism are supported only at one end with the result that one end of the radial bearing is less rigidly held and will rapidly wear, causing the rotary pump mechanism to wear and then chatter during operation. One of the objects of this invention is to provide a mechanism of the class described by which chattering of the bearings employed in the mechanism may be eliminated by distributing the radial load from the mechanism on two bearings positioned above and below the motor or rotating part of the device employed for driving the mechanism and further, to provide a means for maintaining such bearings under a thrust or longitudinal load so that in use, the wear upon the radial bearings is automatically taken up and thus, through the elimination of clearance in the bearings, the chattering overcome.

Another object of the present invention is to provide such a mechanism that the combined thrust or load from both the rotor or rotating part of the device employed for driving the pump and the pump shaft may be taken up on the same bearing or bearings.

Another object of the present invention is to provide such a mechanism that a driven shaft, such as a pump shaft, and a driving or power member, such as the rotor of an electric motor or pulley, may be provided with bearings at opposite ends of the power member, which bearings will there receive both radial and thrust load from both such power member and driven shaft, thus maintaining the same in correct alinement in the mechanism and elminating chatter in the mechanism by automaticaly taking up such radial wear or clearance as would otherwise be present in the radial bearings of the mechanism.

Another object of the present invention is to provide a mechanism by which the longitudinal thrust of the driven shaft of the mechanism such, for instance, as the pump shaft, may be distributed between bearings disposed above and below the means employed for driving such driven shaft so that separate lubricating reservoirs may be provided for the separate bearings and thereby the bearings employed for taking up such thrust load can be maintained at a lower temperature than the bearings of the common type of mechanism which are positioned in a unit oil reservoir.

Another object of the present invention is to provide such a mechanism that the thrust load of the mechanism can be distributed in any desired ratio or proportion between a plurality of bearings and to further provide such a mechanism that the thrust load of the mechanism can be distributed as desired to bearings located at any convenient or desirable location in the rotary pump mechanism.

An important feature of my invention is the provision of a distributing means which makes it possible to distribute thrust and radial load above and below the rotating part of the driving device of the mechanism, whereby it is possible to receive thrust and radial load of both parts upon the same bearings, and this is found to result in a rotary pump mechanism in which there is eliminated several sets of radial and thrust bearings which are now necessary in such a pump structure with a corresponding decrease in the number of bearings and expense of constructing a rotary pump mechanism to operate under a given load.

Various other objects and advantages of the present invention will be understood from the following description of the accompanying drawings, wherein there is set forth a number of examples disclosing the preferred embodiments of the invention. The invention includes various novel parts and combination of arrangements of parts more particularly set forth in the following description.

Reference is therefore made to the accompanying drawings in which

Figure 1 is an elevation of a rotary pump mechanism embodying the present invention, the elevation being partly in vertical longitudinal section.

Figure 2 is a similar elevation, mainly in vertical longitudinal section and with the pump and shaft casing broken away.

Figure 3 is a transverse section on the line 3—3 of Figure 2.

Figure 4 is an elevation, partly in vertical longitudinal section, of a modified form of the invention.

Figure 5 is an elevation, partly in vertical longitudinal section, of a further embodiment of the invention, and, Figure 6 is an elevation, partly in vertical longitudinal section, of a further modification of certain parts of the mechanism.

Referring first to Figures 1 to 3, inclusive, the mechanism comprises a rotary pump 1 which is adapted to be suspended in a well casing, such as 2, by means of its discharge casing 4 concentric with a driven or pump shaft 5 of the pump which shaft 5 is enclosed within a shaft enclosing casing 6. The pump shaft 5 is connected to one or more impellers 7, which draw water in at their lower end 8 and discharge the same from their periphery 9 into a water passage 10 contorted so as to successively receive fluid from the discharge of one impeller and deliver the same to the succeeding impeller. There may be one or any number of such impellers all disposed within the same pump casing and connected to the same pump shaft 5.

The specific construction of such a pump is at present well understood in the art. The discharge casing 4 is connected to a casing head 11 supported upon a frame 12 at the top of the well. Said head 11 is provided with the usual lateral discharge elbow 13.

Supported upon the casing head 11 is provided a motor stand 14 upon which is supported an electrical motor 15 which is preferably of the induction type. The motor 15 is provided with a rotor 16, carried by a hollow power or driving member 17, which extends a distance above and below the rotor 16. The pump shaft 5 of the rotary pump 1 extends vertically upward through the discharge casing 4 and through the casing head 11, the upper end extending through the hollow power member 17 of the motor and there provided with a collar 18 keyed to the shaft 5, said collar 18 being also threaded or otherwise connected, as indicated at 19, to the hollow power member 17 and thus the collar 18 acts as part of the power member. 20 indicates a packing box forming part of the casing head 11, which receives packing 21 packed against the pump shaft 5. The lower end of the box 20 is internally threaded, as indicated at 22, and in use, is connected to the shaft enclosing casing 6 of the shaft. 23 indicates a rib providing an oil duct 24 by which lubricant may be introduced into the shaft enclosing casing 6 so as to flow down such casing and lubricate such bearings for the shaft as are located below the discharge casing 11. The upper end of the discharge casing 11 forms an oil reservoir 25 surrounding the pump shaft 5, which oil reservoir encloses a thrust bearing 26, which may be of any preferred or customary type. 27 indicates a sleeve surrounding the pump shaft 5 fixed to the bottom of the reservoir 26 and extending upwardly above the wearing faces of the thrust bearing 26, which thus provides means for retaining the oil in the reservoir 25.

28 indicates a cylindrical extension of the casing head extending upwardly from the reservoir 25, surrounding the pump shaft 5. Said extension 28 supports a ball radial bearing 29 engaging the power member 17 of the electrical motor 15. The cylindrical section 28 is covered by a cap 30.

31 indicates a pawl pivoted to a stud 32, screw-threaded into the extension 28, which pawl is intended to cooperate with recesses 33 on the upper face of a collar 34, forming the upper thrust member of the bearing 26, so that the thrust bearing 26 is prevented by the pawls 31 from rotating except in one direction. The thrust member 34 being fixed to the hollow power member 17 thus prevents a back rotation of the motor and pump shaft. The collar or upper driven bearing member 34 is provided with a recess 35, which is positioned to engage a pointed stud 36 when the stud is threaded toward the pawl member and elevate the pawl member 31 out of engagement with the notches 33 so that, when desired, such a reverse rotation of the motor and pump shaft may be permitted.

The vertical thrust of the pump shaft 5 of the mechanism and impellers and parts supported thereby is distributed between the collar 18 and a sleeve 37 fitted around the collar 18 by means of a thrust distributing ring 38 engaging the lower face of a nut 39. Said nut 39 is threaded to the upper end of the pump shaft 5, sufficient length of threads being provided so that the pump shaft 5 may be vertically adjusted in the mechanism to properly center the impellers 7 in the pump proper. The distributing ring 38 engages a downwardly and inwardly bevelled face 40 on the sleeve 37 and an upwardly and inwardly bevelled face 41 on the collar 18. The distributing ring may be provided in various shapes and preferably has bevelled faces 42 and 43 fitting the faces 40, 41, respectively, as by such an arrangement, the load may be distributed between the collar 18 and sleeve 37 in any desired ratio. This is accomplished by providing a greater angle to the taper of one side of the ring than the opposed side, thus for example, as shown in Figure 2, the bevelled face 42 of the distributing ring 38 may be disposed at a 30° angle with the vertical, whereas the bevelled face 43 of the distributing ring 38 may be a 60° angle with the vertical. Such a distributing ring 38 will impart substantially double the load upon the collar 18 as imparted to the sleeve 37. It will be apparent how, by changing these angles, the ratio may be varied to suit the designer of the pump mechanism.

The sleeve 37 engages a ball radial and thrust bearing 44 supported within an oil cup 45, provided at the top of the motor 15, said cup being lubricated through an oil line 46 leading through ducts 47 into the reservoir. The bearing 44 and upper end of the pump shaft 5 and adjacent parts is covered by a bonnet 48, so as to be protected from the elements.

It will be apparent that in operation, when it is desired to adjust the longitudinal and vertical position of the pump shaft 5 to properly aline the impellers 7 within the pump 1, it is only necessary to remove the bonnet 48 from the top of the motor 15 and raise or lower the pump shaft 5 by rotating the nut 39, and this is accomplished independent of the vertical adjustment of the hollow member 17 of the motor as the vertical position of such member is not affected by such adjusting operation. It is also seen that vertical thrust load from both the motor 15 and pump shaft 5 is imparted to the same bearings in place of providing separate thrust bearings for such purposes as is the present general practice.

It is also seen that the radial thrust of both the motor 15 and pump shaft 5 is received upon bearings disposed above and below the motor where the bearings are readily accessible to attention and moreover, the provision of such bearing acts to steady the motor 15 and pump shaft 5 and decrease the wear and vibration of the parts.

Referring now to the modified form of the invention shown in Figure 4, the invention is there illustrated as it may be applied to a rotary pump mechanism employing a pulley drive for the pump shaft. This mechanism may be employed in use with a rotary pump, such as illustrated in Figure 1 and extending vertically up through a casing head 11ª is connected with the discharge casing 4ª. The pulley is preferably supported upon a stand 50, mounted upon the casing head 11ª of the rotary pump mechanism and enclosed in a pulley casing 51 resting upon said stand 50. The undersection 52 of the stand 50 provides a closure for the top of the casing head 11ª and surrounding the pump shaft 5ª is a sleeve 53. Said sleeve 53 is provided with a packing gland 54 for the shaft 5ª and also provides a connection for the shaft enclosing casing 6ª so that oil fed down the sleeve 53 may pass down the shaft enclosing casing 6ª.

The pump shaft 5ª extends downwardly through the pulley casing 51 and is provided near its upper end with a collar 18ª keyed to the shaft and threaded at its lower end to a hollow pulley member 17ª upon which a belt pulley 55 is fixed. Said hollow power member 17ª is provided with a circular flange 56 at its lower end, which flange rests upon the top of a radial thrust bearing 57 which also engages the power member 17ª so as to receive vertical thrust from the power member at a place below the flange 56. Said bearing 57 is supported radially and vertically upon a flange 58 formed within an oil basin 59 extending upward within the pulley casing 51.

The bore of the lower end of the power member 17ª is increased in diameter as indicated at 60, so that an oil retaining sleeve 61 may extend between the member 17ª and pump shaft 5ª, said member being connected to the bottom of the pulley casing. At the upper end, the radial thrust of the power member 17ª is imparted through the collar 18ª to a radial thrust bearing 62 supported radially and from below by an annulus 63 extending upwardly from within the bottom of an oil cup 64 provided by a cover 65 for the pulley casing 51, said cup 64 being extended downwardly within the casing and behind the drum of the pulley 55. The bearing 62 receives part of the vertical thrust of the pump shaft 5ª from a distributing ring 66, which is herein illustrated as round in cross section and engaging a sleeve 67 surrounding the collar 18ª and resting upon an upper face of the bearing 62. The ring 66 fits between the sleeve 67 and collar 18ª against bevelled faces on said members and being round in cross section, distributes substantially an equal load from the pump shaft to the bearings 62 and 56. However, as in the preceding embodiment of the invention, this load may be unequally distributed between such bearings, if desired. It is also to be pointed out that it is not essential that the distributor 66 should be of ring shape as it may be formed in various other manners, i. e., might comprise a number of balls arranged in series.

The thrust from the pump shaft 5ª is imparted to the distributing member 66 by a nut 68 threaded to the upper end of said pump shaft 5ª, there being sufficient threads upon the shaft 5ª to permit various vertical adjustments of the shaft. The oil cup 64 and upper end of the pump shaft 5ª is covered by a cover 69, as shown.

It is seen as before that many of the advantages of the previous construction are provided by the modification shown in Figure 4 employing the pulley drive in place of an electrical motor.

Referring now to the embodiment of the invention shown in Figure 5, a mechanism is there shown including a frame 70 upon which the mechanism is supported, said mechanism including a discharge casing 71 connected with a casing head 72 having the usual lateral discharge elbow 73. Mounted upon the casing head 72 is a stand 74 which, in this embodiment of the invention, is shown integral with a pulley casing 75. The motor stand 74 is integral with a sleeve 76, extending downwardly within the casing head 72 and there threaded to a casing 77 which is employed for enclosing a vertical pump shaft 78 and provides a lubricant chamber or conduit for lubricating certain parts of the mechanism disposed below the casing head 72. The sleeve 76 receives a stuffing box 79 at its upper end which packs the shaft 78 to the sleeve 76. The pump shaft 78 extends upwardly through the pulley casing 75 and is threaded at its upper end 80 to an adjusting member or nut 81 which is employed as a means for longitudinally adjusting the position of the pump shaft 78 so that the impellers carried by the shaft may be properly centered within the pump bowl or casing. It is understood, of course, that the mechanism shown in Figure 5 in use is connected with such a pump as is indicated in Figure 1.

The adjusting nut 81 of the mechanism supports the load of the pump shaft 79 upon a hollow power member 82 which member is driven by a pulley 83 disposed in the pulley casing 75. It is understood, however, that in place of the power member 82 mounting a pulley 83, this embodiment of the invention might also employ an electric motor, such as shown in Figures 1 and 2, or other driving means.

The hollow power member 82 is provided with a collar 83 or flange integral with the member, which collar or flange 83 has a horizontal face 84 engaging a rotating bearing member 85 of a ball type radial and thrust bearing also provided with a vertical face 86 engaging the rotatable bearing member 85. It is thus seen that both vertical load and radial load are transferred from the power member 82 to the pump shaft 78 to the combined radial and vertical thrust bearing. Such bearing is provided with a stationary bearing member 87 which is supported upon a ring member 88, which in turn is mounted upon a distributing means 89, which in this embodiment of the invention, is disclosed as a plurality of coil springs arranged circumferentially below the ring 88 and engage the lower end of said ring 88 at one end and at the other end are supported by a cover 89' of the pulley casing 75. Said cover 89' extends downwardly behind the drum of the pulley 83ª so as to provide a lubricant reservoir for the bearing. The stationary part 87 of the bearing is supported radially by the side of such cover 89' or by an inwardly extending flange 90 thereof. Preferably oil ducts 91 are provided to permit the passage of lubricant from above to below the said bearing. 92 indicates a sleeve surrounding the hollow power member 82 but having a clearance therewith, which sleeve extends upwardly from the bottom of the oil reservoir so as to retain the oil within the reservoir.

The bottom of the pulley casing 75 is provided with a cylindrical wall 93 extending upwardly behind the drum of the pulley 83ª so as to provide an annular lubricant reservoir surrounding the lower end of the power member 82 of the mechanism. Close to the shaft, a sleeve 94 is threaded to the bottom of the pulley casing 75 and extends upwardly so as to retain the oil within the reservoir. Within the reservoir is an upwardly extending annular flange 95, which radially and horizontally supports a stationary member 96 of a ball radial and thrust bearing, the rotating member 97 of the bearing having a radial and horizontal engagement with the power member 82 of the mechanism, said power member 82 having an enlarged bore 98, permitting the member to extend over the oil retaining sleeve 94.

In the operation of this embodiment of the invention, the load from the pump shaft 78 and from the hollow power member 82 is supported upon the same bearings which are located at or near the opposite ends of the power member. The distributing means 89 of the mechanism permit such a distribution of the load of these parts of the mechanism and also permit such radial thrust bearings as are shown to be maintained under a vertical load. In this manner, any clearance of such bearings originally present or otherwise tending to develop under load will be automatically taken up as in the preceding embodiment of the invention. This form of the invention also permits the load to be distributed between the separate bearings in any desired manner as the load received upon the upper bearing is determined by the character of the springs 89 employed and can be made as large or small as desired. Also an advantage of this form of distributing the load is that the upper bearing may always carry the same load irrespective of whether the load upon the pump shaft 78 is increased or decreased.

Figure 6 illustrates a further embodiment of certain parts of the mechanism, such parts generally, as will appear from the drawings, relating to the lower bearings and method of connecting the same with a power member of the driving means of the mechanism and it is understood that the arrangement and construction of parts shown in Figure 6 may be applied to any or all of the preceding embodiments of the invention.

In Figure 6, 100 indicates the lower end of a hollow power member which engages a rotating part 101 of a ball radial and thrust bearing so as to impart both a vertical and radial load to the bearing. The bearing has its stationary bearing member 102 supported radially by a sleeve 103 which may be mounted upon an upturned sleeve 104 forming part of a motor or pump casing. The stationary member 102 engages a ring 105 at its lower end which, in turn, is supported upon thrust distributing means 106 in form of a plurality of compression springs arranged circumferentially around the power member 100 and in turn supported by an inturned horizontal flange 107 integral with the sleeve 103. The power member 100 also engages an upper rotating thrust member 108 of a plate type thrust bearing, such upper bearing member 108 being mounted upon a lower bearing member or members 109 which preferably are in the form of segmental bearing shoes.

The modification of the parts shown in Figure 6 is particularly suited for a rotary pump mechanism in which a heavy vertical load must be taken up and incorporates in a rotary pump mechanism, radial bearings for the power member and pump shaft held under vertical load so as to eliminate chatter and take up clearance while also taking up the load which is greater than the ball top radial and thrust bearing may conveniently handle upon a plate type of bearing, such as shown, which is better adapted to withstand a heavy vertical load.

From the description of the preferred embodiments of the invention, it is apparent that the invention may take various forms and, accordingly, is not limited to any particular form or details of construction of parts. The feature of distributing the thrust and radial load from both the power member and pump shaft of the mechanism to bearings disposed at or near ends of the power member is accomplished in the forms of the invention shown and will eliminate much of the expense involved in the additional sets of radial and thrust bearings required with many forms of radial pumps. It is understood, however, that the invention is not limited to the elimination of such extra set of radial or thrust bearings, as it may be more practical in employing this invention upon mechanisms in which an extremely heavy load is placed, to use other bearings besides those shown. However, it will be found that even in such cases, the amount of bearings in it is less and that chattering of the mechanism is substantially reduced.

While the embodiments of the invention herein described are well suited for accomplishing the purposes of this invention, it is not intended to limit the invention to the specific invention shown as modifications may be made in the construction without departing from the spirit of the invention as incorporated in the following claims.

I claim:

1. A rotary pump mechanism having an electric motor, said motor having a driving member mounted on a hollow power member, a rotary pump having a vertical shaft passing through said power member, means connecting said pump shaft to said power member, means above the motor to vertically adjust the pump shaft while retaining the motor in set vertical position, and bearings located above and below the motor and connected to the power member.

2. A rotary pump mechanism comprising in combination a rotary pump, a discharge casing suspending the pump and extending vertically, a pump shaft extending vertically from the pump to above the discharge casing, an electric motor having a hollow power member enclosing the pump shaft, said pump shaft being connected to said power member and supported thereon, bearings for receiving combined load from both the pump shaft and power member, said bearings being located above and below the motor and connected to the power member.

3. In a head for deep well vertical shaft pumps, a discharge outlet passage and thereabove a chamber through which the shaft passes and closed from said passage, a sleeve about said shaft, bearings in which said sleeve is rotatively mounted, means supporting said bearings within said chamber, and motor means within the chamber between the bearings and fixed to said sleeve and means for axially adjusting the shaft within the sleeve and means connecting the shaft and the sleeve in rotative engagement.

4. The combination set forth in claim 3 wherein the bearings comprise a thrust bearing and a plurality of radial bearings.

Signed at Los Angeles, California, this 21st day of May, 1926.

MAHLON E. LAYNE.